United States Patent
Lai et al.

(10) Patent No.: US 11,770,728 B2
(45) Date of Patent: Sep. 26, 2023

(54) METHOD FOR PERFORMING MEASUREMENT SCHEDULING CONTROL BY USER EQUIPMENT, AND ASSOCIATED APPARATUS

(71) Applicant: MEDIATEK INC., Hsin-Chu (TW)

(72) Inventors: Chih-Chieh Lai, Hsinchu (TW); Jianwei Zhang, Beijing (CN); Ming-Chun Chiang, Hsinchu (TW); Mingjun Xu, Beijing (CN); Lun-Han Chang, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 64 days.

(21) Appl. No.: 17/336,349

(22) Filed: Jun. 2, 2021

(65) Prior Publication Data

US 2022/0338047 A1 Oct. 20, 2022

(30) Foreign Application Priority Data

Apr. 20, 2021 (CN) .......................... 202110423273.7

(51) Int. Cl.
*H04W 24/10* (2009.01)
*H04W 52/02* (2009.01)
*H04W 76/10* (2018.01)
*H04B 17/318* (2015.01)

(52) U.S. Cl.
CPC .......... *H04W 24/10* (2013.01); *H04B 17/318* (2015.01); *H04W 52/0209* (2013.01); *H04W 76/10* (2018.02)

(58) Field of Classification Search
None
See application file for complete search history.

(56) References Cited

U.S. PATENT DOCUMENTS

| | | | |
|---|---|---|---|
| 2016/0183192 A1* | 6/2016 | Kang | H04W 52/0254 370/311 |
| 2018/0146430 A1* | 5/2018 | Yadav | H04W 52/0241 |
| 2019/0132088 A1* | 5/2019 | Kumar | H04L 1/1887 |
| 2020/0404644 A1* | 12/2020 | Zhu | G01C 19/00 |
| 2021/0329483 A1* | 10/2021 | Wu | H04W 72/042 |
| 2022/0070707 A1* | 3/2022 | Zhu | H04W 24/08 |
| 2022/0225151 A1* | 7/2022 | Zhang | H04W 52/0229 |

FOREIGN PATENT DOCUMENTS

WO 2020/164720 A1 8/2020

* cited by examiner

*Primary Examiner* — Scott M Sciacca
(74) *Attorney, Agent, or Firm* — Winston Hsu

(57) ABSTRACT

A method for performing measurement scheduling control by a user equipment (UE) and associated apparatus are provided. The method may include: establishing a connection with a base station on a cell of the base station, wherein the UE is configured to perform measurement on at least one reference signal of at least one cell comprising the cell; obtaining, by a modulator-demodulator (Modem) in the UE, sensor information from a sensor system within the UE through a communication interface between the sensor system and the Modem; and controlling periodicity of a measurement cycle of the measurement according to the sensor information in order to reduce power consumption of the UE.

17 Claims, 7 Drawing Sheets

METHOD FOR PERFORMING MEASUREMENT SCHEDULING CONTROL BY USER EQUIPMENT, AND ASSOCIATED APPARATUS

BACKGROUND

The present invention is related to mobile telecommunications, and more particularly, to a method for performing measurement scheduling control by a user equipment (UE), and associated apparatus.

The 3rd Generation Partnership Project (3GPP) unites multiple telecommunications standard development organizations and provides their members with a stable environment to produce the Reports and Specifications that define 3GPP technologies. According to the related art, a UE conforming to the 3GPP specifications may need to report Layer-one (L1)-Reference Signal Received Power (RSRP) to secure the robustness of the connection between the UE and a cell and the associated accuracy may need to meet certain requirement(s), which means the UE should consume power to perform measuring to achieve the required accuracy. Thus, there is a need of a novel method and associated architecture to reduce power consumption of the UE while maintaining communications quality.

SUMMARY

An objective of the present invention is to provide a method for performing measurement scheduling control by a UE, and to provide associated apparatus such as the UE or a modulator-demodulator (Modem), an application processor, a processing circuit, etc. within the UE, in order to solve the aforementioned problems.

Another objective of the present invention is to provide a method for performing measurement scheduling control by a UE, and to provide associated apparatus such as the UE or a Modem, an application processor, a processing circuit, etc. within the UE, in order to reduce power consumption of the UE while maintaining communications quality.

At least one embodiment of the present invention provides a method for performing measurement scheduling control by a UE, where the method may comprise: establishing a connection with a base station on a cell of the base station, wherein the UE is configured to perform measurement on at least one reference signal of at least one cell comprising the cell; obtaining, by a modulator-demodulator (Modem) in the UE, sensor information from a sensor system within the UE through a communication interface between the sensor system and the Modem; and controlling periodicity of a measurement cycle of the measurement according to the sensor information in order to reduce power consumption of the UE.

At least one embodiment of the present invention provides the UE that operates according to the above method, and also provides the Modem that operates according to the above method.

At least one embodiment of the present invention provides an application processor that operates according to the above method, wherein the sensor system is integrated into the application processor, and said communication interface is a communication interface between the application processor and the Modem.

The present invention method and the associated apparatus (e.g. the UE or the Modem, the application processor, etc. within the UE) can properly control measurement scheduling of the UE to save power, and more particularly, reduce power consumption of the UE while maintaining communications quality. In comparison with conventional architecture, the present invention can achieve an optimal performance of the UE without introducing any side effect or in a way that is less likely to introduce side effects.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
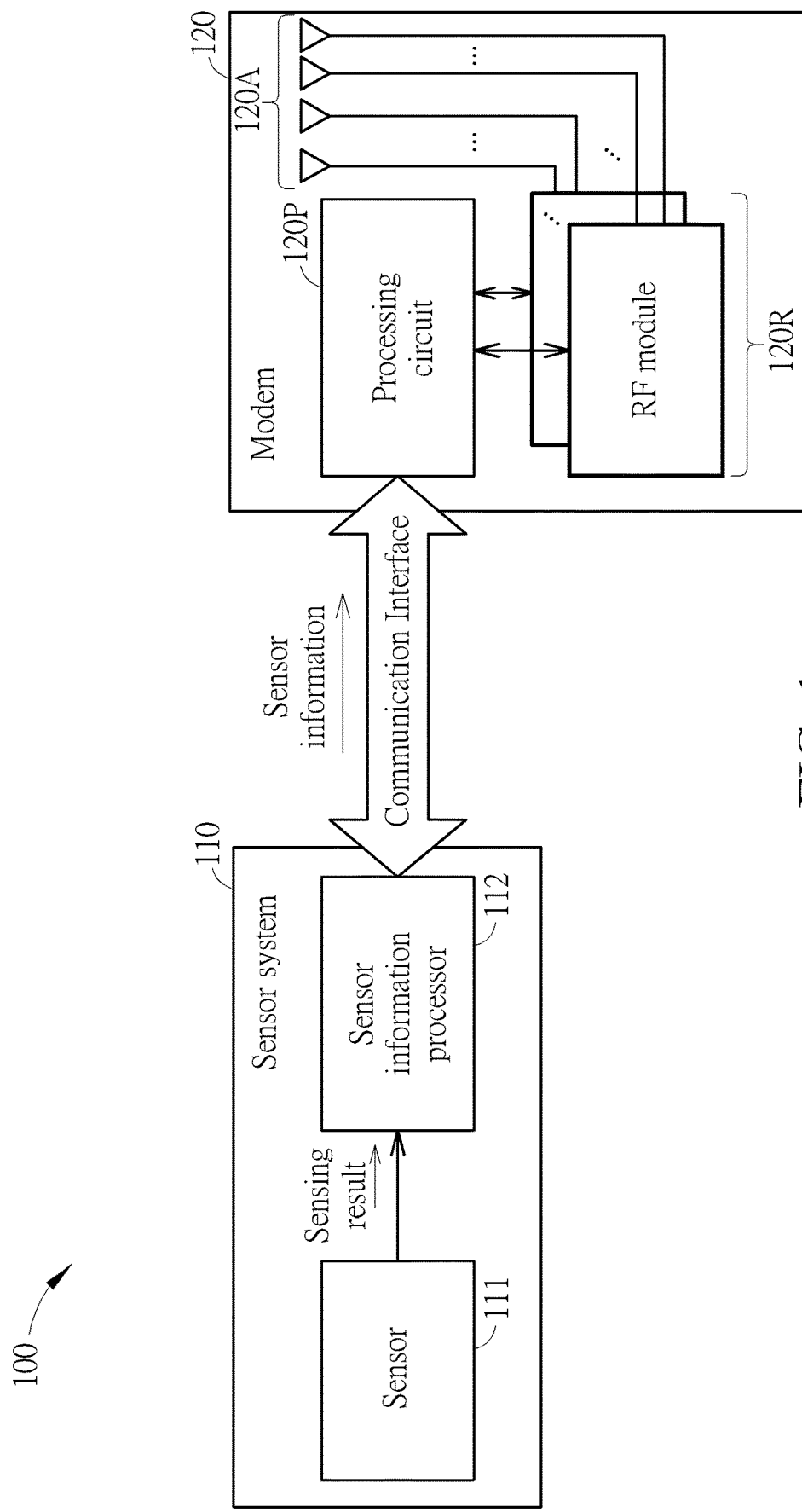
FIG. 1 is a diagram of a user equipment (UE) according to a first embodiment of the present invention.

FIG. 1 is a diagram of a user equipment (UE) 100 according to a first embodiment of the present invention. The UE 100 may comprise a sensor system 110, and comprise a modulator-demodulator (Modem) 120 that is coupled to the sensor system 110 through a communication interface. More particularly, the sensor system 110 may comprise at least one sensor (e.g. one or more sensors), collectively referred to as the sensor 111, and comprise a sensor information processor 112 that is coupled to the sensor 111. In addition, the Modem 120 may comprise a processing circuit 120P and a plurality of Radio Frequency (RF) modules 120R that are coupled to the processing circuit 120P, and comprise a plurality of antennas 120A that are respectively coupled to the RF modules 120R, where the plurality of antennas 120A may comprise multiple sets of antennas, and any set of antennas (e.g. two or more antennas) among the multiple sets of antennas are coupled to a corresponding RF module among the RF modules 120R.

The UE 100 can utilize the sensor system 110 to perform sensing to generate sensor information and send the sensor information to the Modem 120 through the communication interface, for being used by the Modem 120, and more particularly, utilize the at least one sensor such as the sensor 111 to perform the sensing to generate at least one sensing result (e.g. one or more sensing results), and utilize the sensor information processor 112 to process the aforementioned at least one sensing result to generate the sensor information and send the sensor information to the Modem 120 through the communication interface. In addition, the Modem 120 can perform wireless communications with any based station on the corresponding cell thereof among a plurality of based stations on respective cells thereof for the UE 100. Based on the architecture shown in FIG. 1, the UE

100 (e.g. the Modem 120) can perform measurement scheduling control to reduce power consumption of the UE 100 while maintaining communications quality.

For example, in a situation where the UE 100 conforms to the 3GPP specifications, the UE 100 may need to report the aforementioned L1-RSRP, and more particularly, perform associated measuring operations to achieve the required accuracy. As the UE 100 can control measurement scheduling, the UE 100 can reduce power consumption of the UE 100 in an extreme manner without degrading the communications quality.

For better comprehension, the architecture of the UE 100 may be illustrated as shown in FIG. 1, but the present invention is not limited thereto. For example, the UE 100 may comprise an application processor (e.g. a processor running program codes such as an Operation System (OS), drivers, application programs, etc.) configured to control operations of the UE. In some embodiments, the sensor system 110 may be positioned outside the application processor. In some other embodiments, the sensor system 110 may be integrated into the application processor. According to some viewpoints, the plurality of antennas 120A may be regarded as external components of the Modem 120, and therefore may be illustrated outside the Modem 120.

In the embodiment shown in FIG. 1 and the associated embodiments described above, the aforementioned at least one sensor such as the sensor 111 can be implemented by way of gyroscope, proximity sensor, etc., the sensor information processor 112 can be implemented by way of Sensor-hub Context Processor (SCP), etc., the communication interface can be implemented by way of Cross Core Communication Interface (CCCI), etc., the processing circuit 120P can be implemented by way of baseband (BB) processing circuit, etc., and the RF modules 120R can be implemented by way of mixers, amplifiers, oscillators, etc., but the present invention is not limited thereto.

Figure 2:
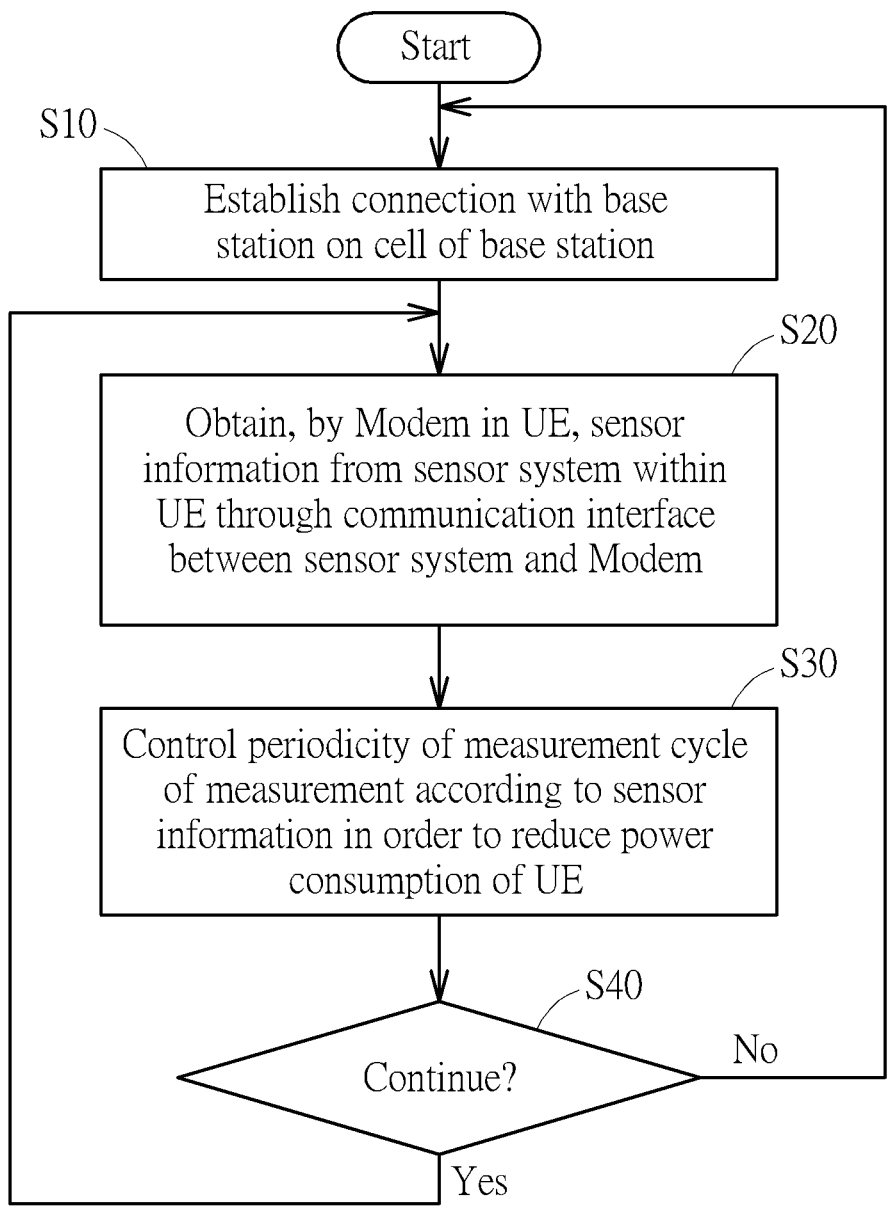
FIG. 2 is a working flow of a method for performing measurement scheduling control by a UE according to an embodiment of the present invention.

FIG. 2 is a working flow of a method for performing measurement scheduling control by a UE such as the UE 100 according to an embodiment of the present invention.

In Step S10, the UE 100 (e.g. the Modem 120) can establish a connection with a base station on a cell of the base station, where the UE 100 can be configured to perform measurement on at least one reference signal (e.g. one or more reference signals) of at least one cell (e.g. one or more cells) comprising the cell of the base station.

In Step S20, the UE 100 can obtain, by using the Modem 120 in the UE 100, the sensor information from the sensor system 110 within the UE 100 through the communication interface between the sensor system 110 and the Modem 120.

In Step S30, the UE 100 (e.g. the Modem 120) can control periodicity of a measurement cycle of the measurement according to the sensor information in order to reduce power consumption of the UE 100.

In Step S40, the UE 100 (e.g. the Modem 120) can determine whether to continue the operations of Steps S20 and S30 for the same connection (e.g. the connection previously established in Step S10). If Yes, Step S20 is entered; if No, Step S10 is entered.

For better comprehension, the method may be illustrated with the working flow shown in FIG. 2, but the present invention is not limited thereto. According to some embodiments, one or more steps may be added, deleted, or changed in the working flow shown in FIG. 2.

According to some embodiments, the UE 100 (e.g. the Modem 120) can be configured to perform the measurement on the aforementioned at least one reference signal of the cell to generate at least one report (e.g. one or more reports). In this situation, in Step S30, the UE 100 (e.g. the Modem 120) can control the periodicity of the measurement cycle of the measurement, as well as periodicity of a report cycle of the aforementioned at least one report, according to the sensor information in order to reduce power consumption of the UE 100. More particularly, the aforementioned at least one report may comprise at least one parameter measured at the UE 100. For example, the aforementioned at least one parameter may comprise a Reference Signal Received Power (RSRP) such as the aforementioned L1-RSRP.

Figure 3:
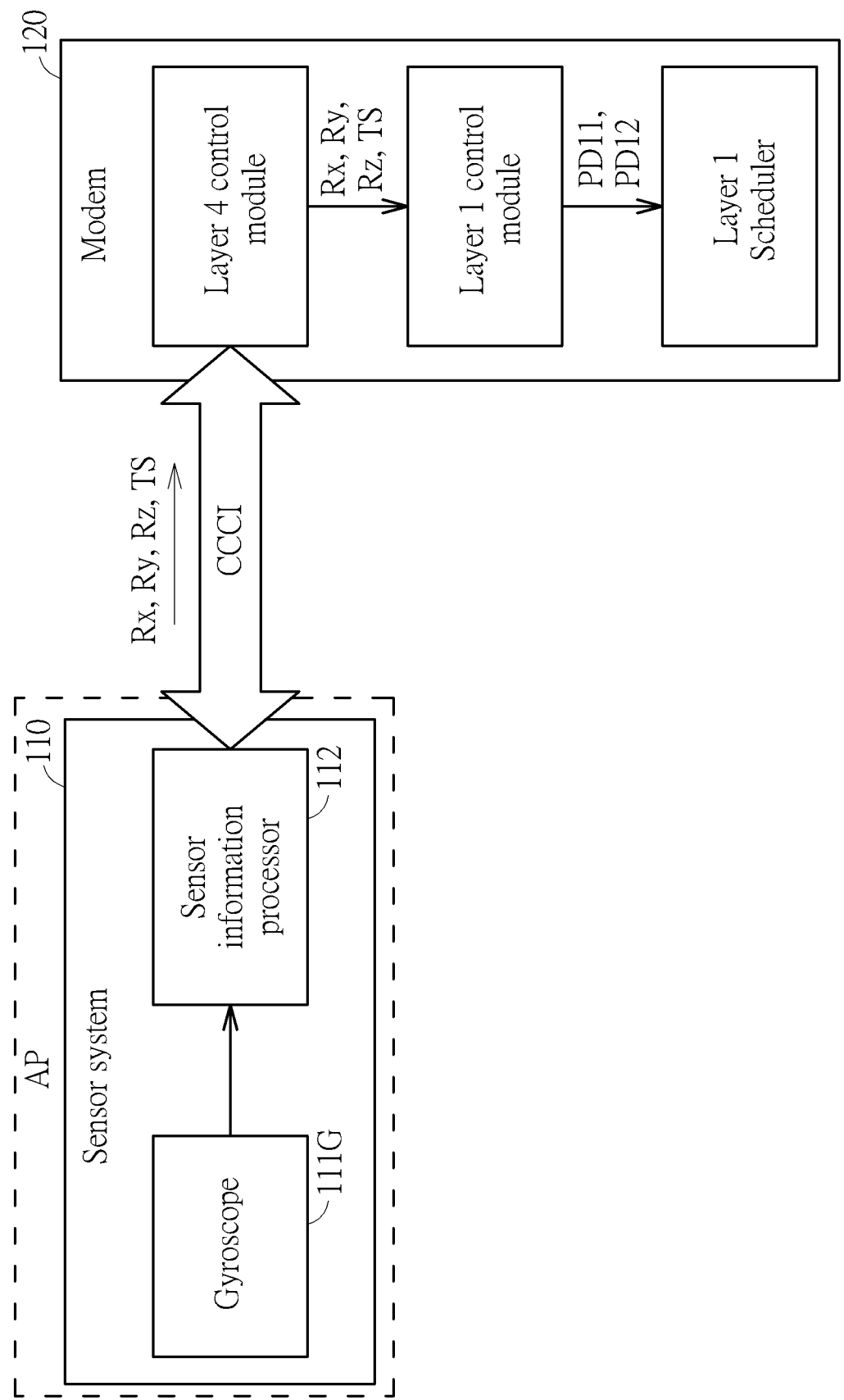
FIG. 3 illustrates a Beam Management (BM)-related control scheme of the method shown in FIG. 2 according to an embodiment of the present invention.

FIG. 3 illustrates a Beam Management (BM)-related control scheme of the method shown in FIG. 2 according to an embodiment of the present invention, where the sensor system 110 may be integrated into the application processor (labeled "AP" for brevity), but the present invention is not limited thereto. For example, the sensor system 110 may be positioned outside of the application processor.

As shown in FIG. 3, the sensor 111 may comprise at least one gyroscope (e.g. one or more gyroscopes), collectively referred to as the gyroscope 111G. In addition, the sensor information may comprise rotational speed information corresponding to the aforementioned at least one gyroscope such as the gyroscope 111G, and the rotational speed information may indicate at least one rotational speed of the UE 100. For example, the rotational speed information may comprise rotational speeds Rx, Ry and Rz respectively corresponding to an x-axis, a y-axis, and a z-axis of the UE 100, where the rotational speeds Rx, Ry and Rz may be measured in unit of radians per second (rad/s), and the sampling rate may reach (e.g., be greater than or equal to) 1.6 kilohertz (kHz), but the present invention is not limited thereto. Please note that, when there is a need, the rotational speeds Rx, Ry and Rz may be measured in any of some other units and/or the sampling rate may vary. Additionally, the Modem 120 can obtain the rotational speed information such as the rotational speeds Rx, Ry and Rz, as well as the associated time information such as a timestamp TS, from the sensor system 110 through the communication interface such as the CCCI. The sensor system 110 (e.g. the sensor information processor 112) can generate the timestamp TS corresponding to the rotational speeds Rx, Ry and Rz according to a same clock within the UE 100. For example, the above symbols {Rx, Ry, Rz, TS} of the rotational speeds Rx, Ry and Rz and the timestamp TS can be written as {Rx(t), Ry(t), Rz(t), TS(t)} (which can be regarded as functions of time t), respectively. When receiving a set of data {Rx(t0), Ry(t0), Rz(t0), TS(t0)} of a certain time point t0 from the sensor system 110, the Modem 120 (e.g. the processing circuit 120P) can obtain the respective latest values of the rotational speeds Rx, Ry and Rz that are measured at the time point t0 from this set of data {Rx(t0), Ry(t0), Rz(t0), TS(t0)}.

The Modem 120 (e.g. the processing circuit 120P) can perform the operation of Step S30 according to the rotational speeds Rx, Ry and Rz. More particularly, the Modem 120 (e.g. the processing circuit 120P) can compare a certain rotational speed indicated by the rotational speed information, such as any rotational speed of the rotational speeds Rx, Ry and Rz as indicated by the rotational speed information {Rx(t0), Ry(t0), Rz(t0)} within the set of data {Rx(t0), Ry(t0), Rz(t0), TS(t0)}, with at least one predetermined rotational speed range to generate at least one comparison result, where the aforementioned at least one comparison result may indicate whether this rotational speed indicated by the rotational speed information falls within the aforementioned at least one predetermined rotational speed range.

In addition, the Modem 120 (e.g. the processing circuit 120P) can selectively change the periodicity of the measurement cycle of the measurement (e.g., as well as the periodicity of the report cycle of the aforementioned at least one report) according to the aforementioned at least one comparison result.

For better comprehension, a possible range of the rotational speeds Rx, Ry and Rz can be divided into a plurality of rotational speed ranges by at least one predetermined rotational speed threshold (e.g. one or more predetermined rotational speed thresholds) such as a rotational speed threshold TH_R. For example, when the rotational speed indicated by the rotational speed information, such as the any rotational speed of the rotational speeds Rx, Ry and Rz as indicated by the rotational speed information {Rx(t0), Ry(t0), Rz(t0)} within the set of data {Rx(t0), Ry(t0), Rz(t0), TS(t0)}, belongs to a greater rotational speed range (e.g. a rotational speed range greater than or equal to the rotational speed threshold TH_R, such as that indicated by the interval [TH_R, ∞)) among the plurality of rotational speed ranges, the Modem 120 (e.g. the processing circuit 120P) can change the periodicity of the measurement cycle of the measurement to correspond to a smaller predetermined period value among a plurality of predetermined period values. For another example, when the rotational speed indicated by the rotational speed information, such as the any rotational speed of the rotational speeds Rx, Ry and Rz as indicated by the rotational speed information {Rx(t0), Ry(t0), Rz(t0)} within the set of data {Rx(t0), Ry(t0), Rz(t0), TS(t0)}, belongs to a smaller rotational speed range (e.g. a rotational speed range less than the rotational speed threshold TH_R, such as that indicated by the interval [0, TH_R)) among the plurality of rotational speed ranges, the Modem 120 (e.g. the processing circuit 120P) can change the periodicity of the measurement cycle of the measurement to correspond to a greater predetermined period value among the plurality of predetermined period values, but the present invention is not limited thereto. In some embodiments, when the rotational speed indicated by the rotational speed information, such as the any rotational speed of the rotational speeds Rx, Ry and Rz as indicated by the rotational speed information {Rx(t0), Ry(t0), Rz(t0)} within the set of data {Rx(t0), Ry(t0), Rz(t0), TS(t0)}, is equal to a zero rotational speed, the Modem 120 (e.g. the processing circuit 120P) can change the periodicity of the measurement cycle of the measurement to correspond to the greater predetermined period value mentioned above.

In the architecture shown in FIG. 3, the processing circuit 120P may comprise multiple sub-circuits such as a Layer-four (labeled "Layer 4" for brevity) control module, a Layer-one (labeled "Layer 1" for brevity) control module and a Layer 1 Scheduler, but the present invention is not limited thereto. In addition, the periodicity that can be changed by the processing circuit 120P according to the sensor information such as the rotational speed information may include, but are not limited to, BM-related control periods PD11, PD12, etc., where the BM-related control period PD11 may represent the periodicity of antenna weighting vector optimization (e.g. the periodicity of a changing/optimizing cycle of an antenna weighting optimization procedure, such as the period of changing and optimizing respective antenna weighting values of the any set of antennas for the corresponding RF module), and the BM-related control period PD12 may represent the periodicity of RF-head monitoring (e.g. the periodicity of a monitoring cycle of an RF-head monitoring procedure, such as the period of monitoring reliability of a certain RF module among the RF modules 120R). As the Modem 120 (e.g. the processing circuit 120P) can dynamically adjust the periodicity such as the BM-related control periods PD11, PD12, etc. according to the sensor information such as the rotational speed information, the Modem 120 (e.g. the processing circuit 120P) can reduce power consumption of the UE 100 while maintaining communications quality. For brevity, similar descriptions for this embodiment are not repeated in detail here.

Figure 4:
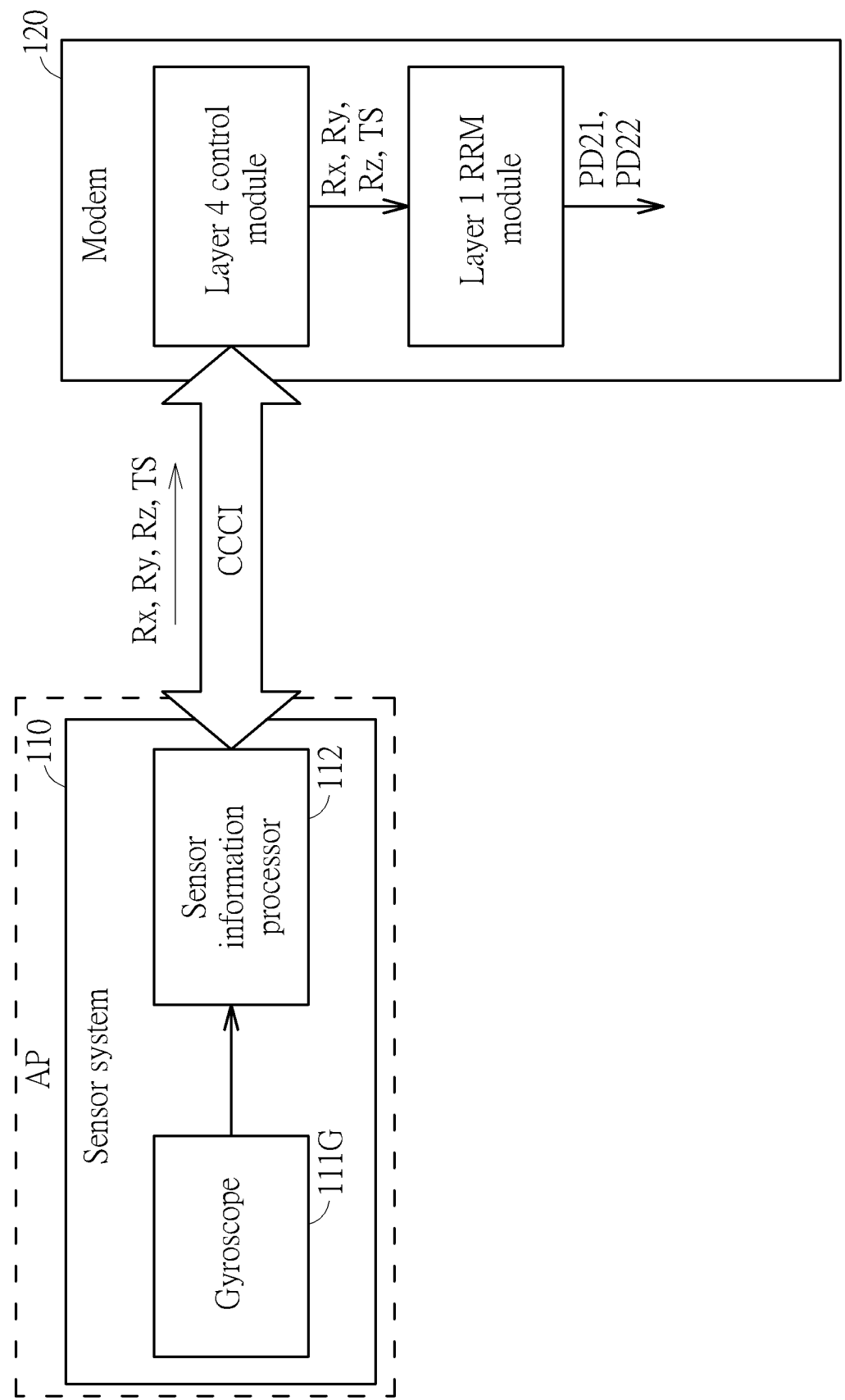
FIG. 4 illustrates a Radio Resource Management (RRM)-related control scheme of the method shown in FIG. 2 according to an embodiment of the present invention.

FIG. 4 illustrates a Radio Resource Management (RRM)-related control scheme of the method shown in FIG. 2 according to an embodiment of the present invention, where the sensor system 110 may be integrated into the application processor (labeled "AP" for brevity), but the present invention is not limited thereto. For example, the sensor system 110 may be positioned outside of the application processor.

In comparison with the architecture shown in FIG. 3, the processing circuit 120P of this embodiment may comprise the multiple comprise sub-circuits such as the Layer-four (labeled "Layer 4" for brevity) control module, a Layer-one (labeled "Layer 1" for brevity) RRM module, etc., but the present invention is not limited thereto. In addition, the periodicity that can be changed by the processing circuit 120P according to the sensor information such as the rotational speed information may include, but are not limited to, RRM-related control periods PD21, PD22, etc., where the RRM-related control period PD21 may represent the periodicity of intra-frequency Cell Search (CS)/Cell Measurement (CM) (e.g. the periodicity of a CS/CM cycle of an intra-frequency handover procedure, such as the period of performing CS/CM by the UE 100 in a connected mode/state on different cells having the same LTE frequency), and the RRM-related control period PD22 may represent the periodicity of inter-frequency CS/CM (e.g. the periodicity of a CS/CM cycle of an inter-frequency handover procedure, such as the period of performing CS/CM on different cells for changing or switching of a connection involving the UE 100 from one frequency to another frequency). As the Modem 120 (e.g. the processing circuit 120P) can dynamically adjust the periodicity such as the RRM-related control periods PD21, PD22, etc. according to the sensor information such as the rotational speed information, the Modem 120 (e.g. the processing circuit 120P) can reduce power consumption of the UE 100 while maintaining communications quality. For brevity, similar descriptions for this embodiment are not repeated in detail here.

Figure 5:
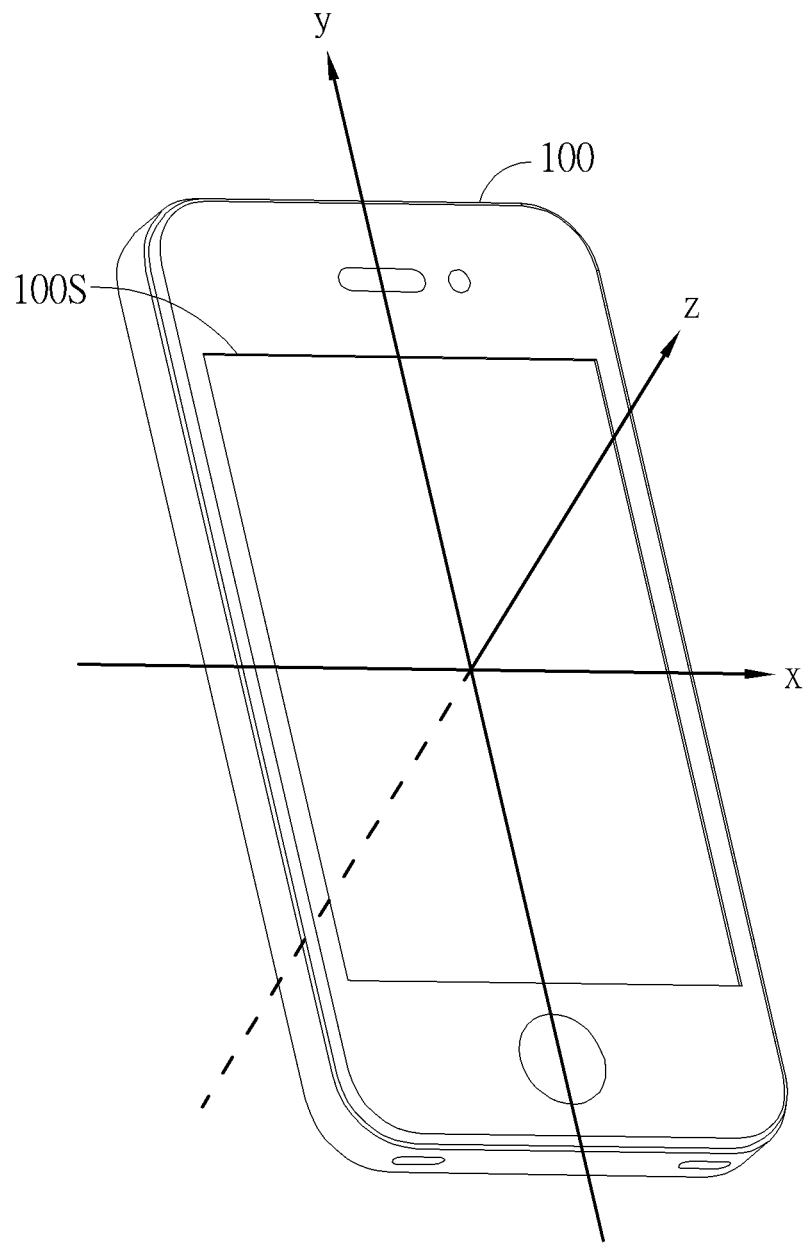
FIG. 5 illustrates an example of the UE.

FIG. 5 illustrates an example of the UE 100. The UE 100 can be implemented by way of a multifunctional mobile phone. For better comprehension, the x-axis, the y-axis and the z-axis may be illustrated as shown in FIG. 5, where the z-axis is perpendicular to a touch-sensitive display panel 100S (e.g. a touch screen) of the UE 100, and the x-axis and the y-axis correspond to the horizontal direction and the vertical direction of the touch-sensitive display panel 100S, respectively, but the present invention is not limited thereto. For brevity, similar descriptions for this embodiment are not repeated in detail here.

Figure 6:
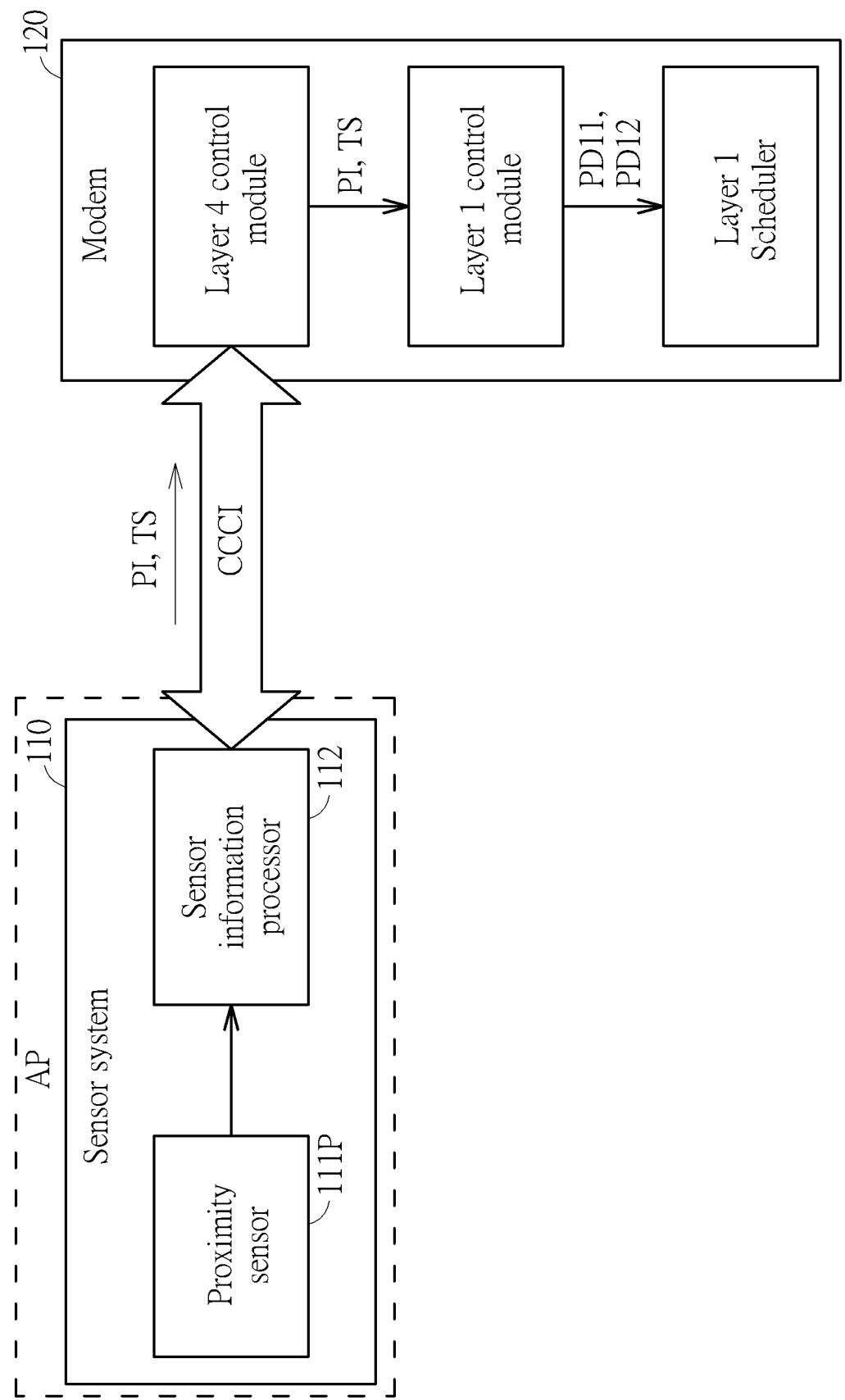
FIG. 6 illustrates the BM-related control scheme of the method shown in FIG. 2 according to another embodiment of the present invention.

FIG. 6 illustrates the BM-related control scheme of the method shown in FIG. 2 according to another embodiment of the present invention, where the sensor system 110 may be integrated into the application processor (labeled "AP" for brevity), but the present invention is not limited thereto. For example, the sensor system 110 may be positioned outside of the application processor.

As shown in FIG. 6, the sensor 111 may comprise a proximity sensor 111P. In addition, the sensor information may comprise proximity information corresponding to the proximity sensor 111P, and the proximity information may indicate a proximity value PI of the UE 100 with respect to a user of the UE 100. For example, the proximity value PI may represent a distance between the user (e.g. the user's face) and the UE 100 along the z-axis of the UE 100, but the present invention is not limited thereto. Additionally, the Modem 120 can obtain the proximity information such as the proximity sensor 111P, as well as the associated time information such as a timestamp TS, from the sensor system 110 through the communication interface such as the CCCI. The sensor system 110 (e.g. the sensor information processor 112) can generate the timestamp TS corresponding to the proximity value PI according to a same clock within the UE 100. For example, the above symbols {PI, TS} of the proximity value PI and the timestamp TS can be written as {PI(t), TS(t)} (which can be regarded as functions of time t), respectively. When receiving a set of data {PI(t0), TS(t0)} of a certain time point t0 from the sensor system 110, the Modem 120 (e.g. the processing circuit 120P) can obtain the latest value of the proximity value PI that is measured at the time point t0 from this set of data {PI(t0), TS(t0)}.

The Modem 120 (e.g. the processing circuit 120P) can perform the operation of Step S30 according to the proximity value PI. More particularly, the Modem 120 (e.g. the processing circuit 120P) can compare the proximity value PI indicated by the proximity information, such as the proximity value PI indicated by the proximity information {PI(t0)} within the set of data {PI(t0), TS(t0)}, with at least one predetermined proximity range to generate at least one comparison result, where the aforementioned at least one comparison result may indicate whether the proximity value PI indicated by the proximity information falls within the aforementioned at least one predetermined proximity range. In addition, the Modem 120 (e.g. the processing circuit 120P) can selectively change the periodicity of the measurement cycle of the measurement (e.g., as well as the periodicity of the report cycle of the aforementioned at least one report) according to the aforementioned at least one comparison result.

For better comprehension, a possible range of the proximity value PI can be divided into a plurality of proximity ranges by at least one predetermined proximity threshold (e.g. one or more predetermined proximity thresholds) such as a predetermined proximity threshold TH_P. For example, when the proximity value PI indicated by the proximity information, such as the proximity value PI indicated by the proximity information {PI(t0)} within the set of data {PI(t0), TS(t0)}, is less than the predetermined proximity threshold TH_P, the Modem 120 (e.g. the processing circuit 120P) can change the periodicity of the measurement cycle of the measurement to correspond to a smaller predetermined period value among the plurality of predetermined period values. For another example, when the proximity value PI indicated by the proximity information, such as the proximity value PI indicated by the proximity information {PI(t0)} within the set of data {PI(t0), TS(t0)}, is greater than the predetermined proximity threshold TH_P, the Modem 120 (e.g. the processing circuit 120P) can change the periodicity of the measurement cycle of the measurement to correspond to a greater predetermined period value among the plurality of predetermined period values, but the present invention is not limited thereto. In some embodiments, when the proximity value PI indicated by the proximity information, such as the proximity value PI indicated by the proximity information {PI(t0)} within the set of data {PI(t0), TS(t0)}, keeps unchanged for a time period and the time period reaches (e.g. be greater than or equal to) a predetermined time period threshold TH_T, the Modem 120 (e.g. the processing circuit 120P) can change the periodicity of the measurement cycle of the measurement to correspond to the greater predetermined period value among the plurality of predetermined period values; otherwise, the Modem 120 (e.g. the processing circuit 120P) can change the periodicity of the measurement cycle of the measurement to correspond to the smaller predetermined period value among the plurality of predetermined period values.

As the Modem 120 (e.g. the processing circuit 120P) can dynamically adjust the periodicity such as the BM-related control periods PD11, PD12, etc. according to the sensor information such as the proximity information, the Modem 120 (e.g. the processing circuit 120P) can reduce power consumption of the UE 100 while maintaining communications quality. For brevity, similar descriptions for this embodiment are not repeated in detail here.

Figure 7:
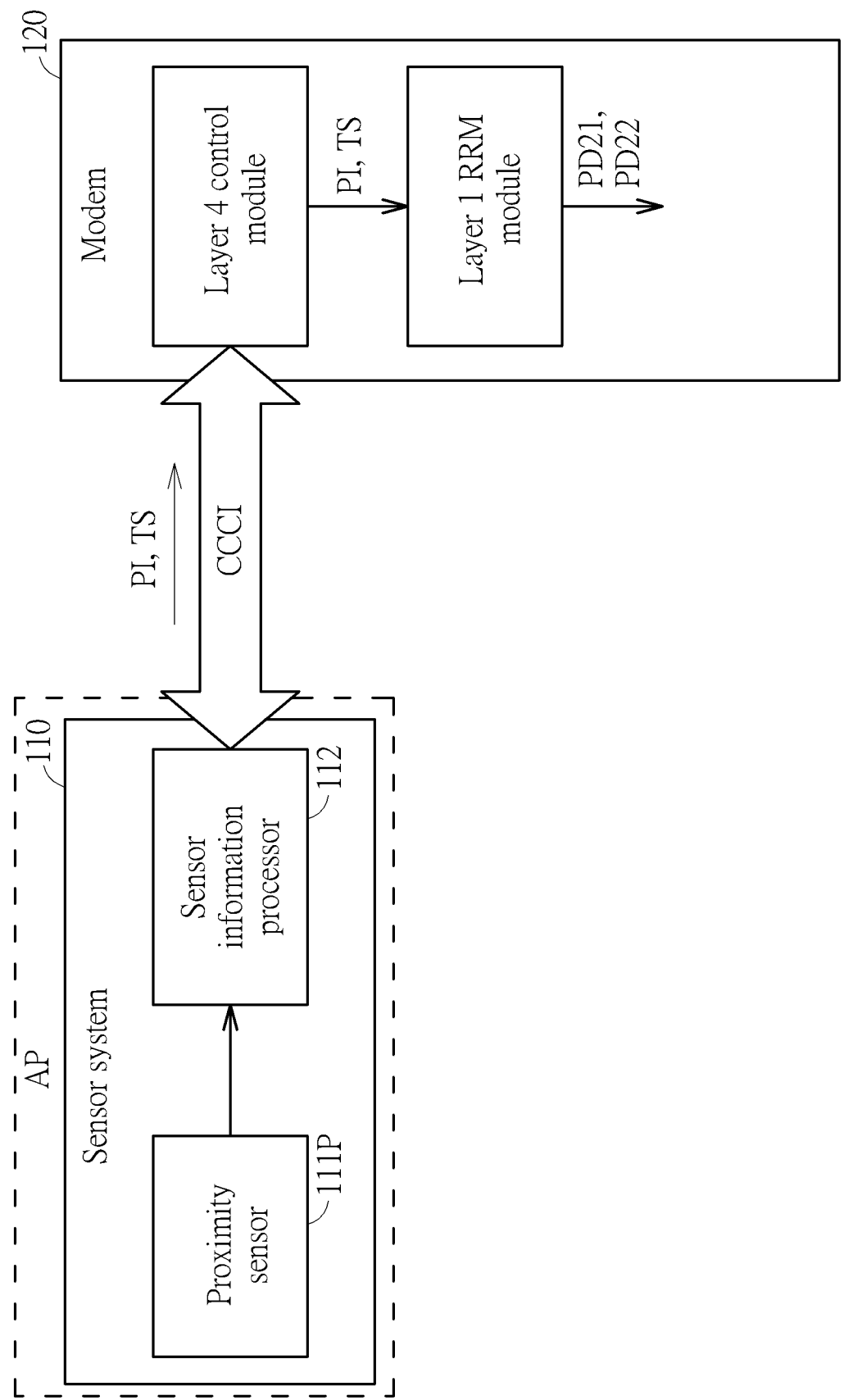
FIG. 7 illustrates the RRM-related control scheme of the method shown in FIG. 2 according to another embodiment of the present invention.

FIG. 7 illustrates the RRM-related control scheme of the method shown in FIG. 2 according to another embodiment of the present invention, where the sensor system 110 may be integrated into the application processor (labeled "AP" for brevity), but the present invention is not limited thereto. For example, the sensor system 110 may be positioned outside of the application processor.

As the Modem 120 (e.g. the processing circuit 120P) can dynamically adjust the periodicity such as the RRM-related control periods PD21, PD22, etc. according to the sensor information such as the proximity information, the Modem 120 (e.g. the processing circuit 120P) can reduce power consumption of the UE 100 while maintaining communications quality. For brevity, similar descriptions for this embodiment are not repeated in detail here.

Further details regarding the method (e.g. the BM-related control scheme and/or the RRM-related control scheme of the method) may be described as follows. According to some embodiments, the measurement mentioned in Step S10 can be used for associated control regarding the aforementioned at least one cell. For example, the associated control may comprise BM. For another example, the associated control may comprise RRM, where the at least one cell may represent multiple cells. For yet another example, the associated control may comprise BM and RRM, where the at least one cell may represent multiple cells.

TABLE 1

| When the sensors show: | BM scheduling | Purpose |
|---|---|---|
| 1. Large rotational speed; or 2. UE being close to user; | 1. Modem might speed up BM operations to update RX beam or perform selection of mmW RF head; and 2. Predict AWV; | Performance enhancement |
| 1. Zero rotation speed; or 2. No observable change from proximity; | Modem might slow down BM operations | Power saving |

Table 1 illustrates some examples of BM-related scheduling control operations regarding the BM-related control scheme. When the sensors of the sensor system 110 show that there is a large rotational speed or that the UE 100 gets close to the user, the Modem 120 can speed up the BM operations (e.g. decrease the periodicity such as the BM-related control periods PD11, PD12, etc.) to update receiving (RX) beam or perform selection of millimeter wave (mmW) RF head (e.g. RF module), and predict the antenna weighting vector (AWV), for enhancing the communications performance of the UE 100. When the sensors of the sensor system 110 show that there is a zero rotation speed or that no observable change of the distance between the user and the UE 100 can be detected from the proximity sensor 111P, the Modem 120 can slow down the BM operations (e.g. increase the periodicity such as the BM-related control periods PD11, PD12, etc.), for saving power of the UE 100. Thus, the UE 100 (e.g. the Modem 120) can optimize the scheduling in terms of power saving or performance enhancement for BM with the sensor information provided by sensor system 110 such as the gyroscope 111G and the proximity sensor 111P while guaranteeing user experience without violating the accuracy requirement. For brevity, similar descriptions for this embodiment are not repeated in detail here.

TABLE 2

| When the sensors show: | RRM scheduling | Purpose |
| --- | --- | --- |
| 1. Large rotational speed; or<br>2. UE being close to user; | Modem might speed up RRM operations to perform cell search or cell measurement for mobility | Performance enhancement |
| 1. Zero rotation speed; or<br>2. No observable change from proximity; | Modem might slow down RRM operations | Power saving |

Table 2 illustrates some examples of RRM-related scheduling control operations regarding the RRM-related control scheme. When the sensors of the sensor system 110 show that there is a large rotational speed or that the UE 100 gets close to the user, the Modem 120 can speed up the RRM operations (e.g. decrease the periodicity such as the RRM-related control periods PD21, PD22, etc.) to perform cell search (CS) or cell measurement (CM) for mobility such as the UE 100, for enhancing the communications performance of the UE 100. When the sensors of the sensor system 110 show that there is a zero rotation speed or that no observable change of the distance between the user and the UE 100 can be detected from the proximity sensor 111P, the Modem 120 can slow down the RRM operations (e.g. increase the periodicity such as the RRM-related control periods PD21, PD22, etc.), for saving power of the UE 100. Thus, the UE 100 (e.g. the Modem 120) can optimize the scheduling in terms of power saving or performance enhancement for RRM with the sensor information provided by sensor system 110 such as the gyroscope 111G and the proximity sensor 111P while guaranteeing user experience without violating the accuracy requirement. For example, when the UE 100 is in the cell edge (e.g. the edge of the cell), ping-pong handover may occur due to similar received signal level (e.g. RSRP). With the aid of the sensor information provided by the sensor system 110, the UE 100 is capable of locking to one call to save power consumption and stable reception quality. For brevity, similar descriptions for this embodiment are not repeated in detail here.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing measurement scheduling control by a user equipment (UE), the method comprising:
establishing a connection with a base station on a cell of the base station, wherein the UE is configured to perform measurement on at least one reference signal of at least one cell comprising the cell;
obtaining, by a modulator-demodulator (Modem) in the UE, sensor information from a sensor system within the UE through a communication interface between the sensor system and the Modem; and
for a plurality of successive control periods, controlling periodicity of a measurement cycle of the measurement according to the sensor information in order to reduce power consumption of the UE, wherein a first measurement is used for associated control regarding the at least one cell, the associated control comprises Beam Management (BM), and the first measurement is performed in a first control period of the plurality of successive control periods, a second measurement is used for associated control regarding the at least one cell, and the associated control comprises Radio Resource Management (RRM), and the second measurement is performed in a second control period immediately following the first control period, wherein the first measurement is different from the second measurement, and the at least one cell represents multiple cells.

2. The method of claim 1, wherein the Modem is coupled to the sensor system through the communication interface; and the method further comprises:
utilizing the sensor system to perform sensing to generate the sensor information and send the sensor information to the Modem through the communication interface, for being used by the Modem.

3. The method of claim 2, wherein the sensor system comprises at one sensor and a sensor information processor; and utilizing the sensor system to perform the sensing to generate the sensor information and send the sensor information to the Modem through the communication interface further comprises:
utilizing the at least one sensor to perform the sensing to generate at least one sensing result; and
utilizing the information processor to process the at least one sensing result to generate the sensor information and send the sensor information to the Modem through the communication interface.

4. The method of claim 1, wherein the UE is configured to perform the measurement on the at least one reference signal of the cell to generate at least one report; and controlling the periodicity of the measurement cycle of the measurement according to the sensor information in order to reduce power consumption of the UE further comprises:
controlling the periodicity of the measurement cycle of the measurement, as well as periodicity of a report cycle of the at least one report, according to the sensor information in order to reduce power consumption of the UE.

5. The method of claim 4, wherein the at least one report comprises at least one parameter measured at the UE.

6. The method of claim 5, wherein the at least one parameter comprises a Reference Signal Received Power (RSRP).

7. The method of claim 1, wherein the sensor information comprises rotational speed information corresponding to at least one gyroscope within the sensor system, and the rotational speed information indicates a rotational speed of the UE.

8. The method of claim 7, wherein controlling the periodicity of the measurement cycle of the measurement according to the sensor information in order to reduce power consumption of the UE further comprises:

comparing the rotational speed indicated by the rotational speed information with at least one predetermined rotational speed range to generate at least one comparison result, wherein the at least one comparison result indicates whether the rotational speed indicated by the rotational speed information falls within the at least one predetermined rotational speed range; and selectively changing the periodicity of the measurement cycle of the measurement according to the at least one comparison result.

9. The method of claim 7, wherein controlling the periodicity of the measurement cycle of the measurement according to the sensor information in order to reduce power consumption of the UE further comprises:

in response to the rotational speed indicated by the rotational speed information belonging to a greater rotational speed range among a plurality of rotational speed ranges, changing the periodicity of the measurement cycle of the measurement to correspond to a smaller predetermined period value among a plurality of predetermined period values.

10. The method of claim 7, wherein controlling the periodicity of the measurement cycle of the measurement according to the sensor information in order to reduce power consumption of the UE further comprises:

in response to the rotational speed indicated by the rotational speed information being equal to a zero rotational speed, changing the periodicity of the measurement cycle of the measurement to correspond to a greater predetermined period value among a plurality of predetermined period values.

11. The method of claim 1, wherein the sensor information comprises proximity information corresponding to a proximity sensor within the sensor system, the proximity information indicates a proximity value of the UE with respect to a user, and when the proximity information is unchanged over a specific period of time, the method further comprises:

decreasing the periodicity of measurement.

12. The method of claim 11, wherein controlling the periodicity of the measurement cycle of the measurement according to the sensor information in order to reduce power consumption of the UE further comprises:

comparing the proximity value indicated by the proximity information with at least one predetermined proximity range to generate at least one comparison result, wherein the at least one comparison result indicates whether the proximity value indicated by the proximity information falls within the at least one predetermined proximity range; and selectively changing the periodicity of the measurement cycle of the measurement according to the at least one comparison result.

13. The method of claim 11, wherein controlling the periodicity of the measurement cycle of the measurement according to the sensor information in order to reduce power consumption of the UE further comprises:

in response to the proximity value indicated by the proximity information being less than a predetermined proximity threshold, changing the periodicity of the measurement cycle of the measurement to correspond to a smaller predetermined period value among a plurality of predetermined period values.

14. The method of claim 11, wherein controlling the periodicity of the measurement cycle of the measurement according to the sensor information in order to reduce power consumption of the UE further comprises:

in response to the proximity value indicated by the proximity information being greater than a predetermined proximity threshold, changing the periodicity of the measurement cycle of the measurement to correspond to a greater predetermined period value among a plurality of predetermined period values.

15. The Modem that operates according to the method of claim 1.

16. The UE that operates according to the method of claim 1.

17. An application processor that operates according to the method of claim 1, wherein the sensor system is integrated into the application processor, and said communication interface is a communication interface between the application processor and the Modem.

* * * * *